(12) United States Patent
Brownlow et al.

(10) Patent No.: US 9,393,488 B2
(45) Date of Patent: Jul. 19, 2016

(54) DYNAMICALLY DEPICTING INTERACTIONS IN A VIRTUAL WORLD BASED ON VARIED USER RIGHTS

(75) Inventors: Sean T. Brownlow, Rochester, MN (US); Jeffrey F. Eisterhold, Kasson, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 830 days.

(21) Appl. No.: 12/874,868

(22) Filed: Sep. 2, 2010

(65) Prior Publication Data

US 2011/0083086 A1 Apr. 7, 2011

Related U.S. Application Data

(60) Provisional application No. 61/239,615, filed on Sep. 3, 2009.

(51) Int. Cl.
*A63F 13/30* (2014.01)
*G06F 3/0481* (2013.01)
*H04L 29/08* (2006.01)
*H04L 29/06* (2006.01)

(52) U.S. Cl.
CPC ............ *A63F 13/12* (2013.01); *G06F 3/04815* (2013.01); *H04L 67/22* (2013.01); *H04L 67/38* (2013.01); *A63F 2300/535* (2013.01); *A63F 2300/556* (2013.01); *A63F 2300/5586* (2013.01); *A63F 2300/572* (2013.01)

(58) Field of Classification Search
CPC .................. A63F 2300/5586; A63F 2300/535; A63F 2300/556; A63F 2300/10; A63F 2300/12; A63F 2300/5553; A63F 2300/8082
USPC .......................................................... 715/753
See application file for complete search history.

(56) References Cited

U.S. PATENT DOCUMENTS

| 6,829,582 | B1 * | 12/2004 | Barsness | 704/275 |
| 6,842,175 | B1 | 1/2005 | Schmalstieg et al. | |
| 7,171,558 | B1 | 1/2007 | Mourad et al. | |
| 7,899,779 | B1 * | 3/2011 | Oganesyan | 707/609 |
| 7,899,782 | B1 * | 3/2011 | Oganesyan | 707/610 |
| 8,046,700 | B2 * | 10/2011 | Bates et al. | 715/757 |
| 8,099,668 | B2 * | 1/2012 | Garbow et al. | 715/751 |
| 8,239,776 | B2 * | 8/2012 | Bates et al. | 715/757 |
| 8,241,131 | B2 * | 8/2012 | Bhogal et al. | 463/42 |
| 8,281,361 | B1 * | 10/2012 | Schepis et al. | 726/1 |
| 8,291,065 | B2 * | 10/2012 | Goodman et al. | 709/224 |
| 8,291,327 | B2 * | 10/2012 | Bates et al. | 715/757 |

(Continued)

OTHER PUBLICATIONS

Cesar-et al.; "Enhancing Social Sharing of Videos: Fragment, Annotate, Enrich, and Share"; ACM Digital Library; pp. 11-20; Oct. 2008.

*Primary Examiner* — Ajay Bhatia
*Assistant Examiner* — Phoebe Pan
(74) *Attorney, Agent, or Firm* — Patterson + Sheridan, LLP

(57) ABSTRACT

Embodiments of the invention generally manage dynamically depicting interactions in a virtual world. Embodiments of the invention may receive one or more content restrictions associated with a first user of a virtual world, and may analyze the activity history of a second user in the virtual world. Embodiments of the invention may then determine what, if any, interactions should be permitted between the first user and the second user in the virtual world.

18 Claims, 5 Drawing Sheets

(56) References Cited

U.S. PATENT DOCUMENTS

| | | | |
|---|---|---|---|
| 8,296,843 B2* | 10/2012 | Myers et al. ................... 726/22 |
| 8,301,653 B2* | 10/2012 | Adamousky et al. ......... 707/769 |
| 8,347,217 B2* | 1/2013 | Brillhart et al. ............... 715/757 |
| 2002/0198940 A1* | 12/2002 | Bower et al. ................... 709/204 |
| 2004/0111479 A1* | 6/2004 | Borden et al. ................. 709/206 |
| 2005/0022234 A1* | 1/2005 | Strothman et al. .............. 725/34 |
| 2005/0027723 A1* | 2/2005 | Jones et al. ................... 707/100 |
| 2006/0253784 A1* | 11/2006 | Bower et al. ................... 715/738 |
| 2007/0035549 A1* | 2/2007 | Jung ................. G06Q 30/0601 345/474 |
| 2007/0038559 A1* | 2/2007 | Jung ..................... G06Q 20/10 705/39 |
| 2007/0050214 A1* | 3/2007 | Hawks et al. ..................... 705/3 |
| 2008/0034040 A1* | 2/2008 | Wherry et al. ................. 709/204 |
| 2008/0059198 A1* | 3/2008 | Maislos et al. ................ 704/273 |
| 2008/0120636 A1* | 5/2008 | Gahman ........................ 725/28 |
| 2008/0162202 A1* | 7/2008 | Khanna et al. ................... 705/7 |
| 2008/0214253 A1* | 9/2008 | Gillo et al. ........................ 463/1 |
| 2008/0215973 A1* | 9/2008 | Zalewski et al. .............. 715/706 |
| 2008/0215994 A1* | 9/2008 | Harrison et al. ............... 715/757 |
| 2008/0278312 A1* | 11/2008 | Kristensson et al. .... 340/539.13 |
| 2009/0049513 A1 | 2/2009 | Root et al. |
| 2009/0070180 A1* | 3/2009 | Jung ................... G06Q 40/025 705/38 |
| 2009/0079816 A1* | 3/2009 | Qvarfordt et al. .......... 348/14.16 |
| 2009/0089417 A1* | 4/2009 | Giffin et al. ................... 709/224 |
| 2009/0113319 A1* | 4/2009 | Dawson et al. ............... 715/762 |
| 2009/0115776 A1* | 5/2009 | Bimbra et al. ................ 345/419 |
| 2009/0132689 A1* | 5/2009 | Zaltzman et al. ............. 709/223 |
| 2009/0133051 A1* | 5/2009 | Hildreth .......................... 725/28 |
| 2009/0150778 A1* | 6/2009 | Nicol, II ....................... 715/706 |
| 2009/0174702 A1 | 7/2009 | Garbow et al. |
| 2009/0177979 A1* | 7/2009 | Garbow et al. ............... 715/757 |
| 2009/0187461 A1* | 7/2009 | Brignull ................. G06Q 30/02 705/7.33 |
| 2009/0204907 A1* | 8/2009 | Finn ...................... G06Q 30/02 715/757 |
| 2009/0234667 A1* | 9/2009 | Thayne .............................. 705/1 |
| 2010/0175129 A1* | 7/2010 | Doddy et al. ................... 726/22 |
| 2010/0268682 A1* | 10/2010 | Lewis et al. ..................... 706/54 |
| 2011/0178793 A1* | 7/2011 | Giffin et al. ....................... 704/9 |
| 2012/0050286 A1* | 3/2012 | Yockey ................... A63F 13/55 345/420 |
| 2012/0115597 A1* | 5/2012 | Waugaman et al. ............ 463/31 |

\* cited by examiner

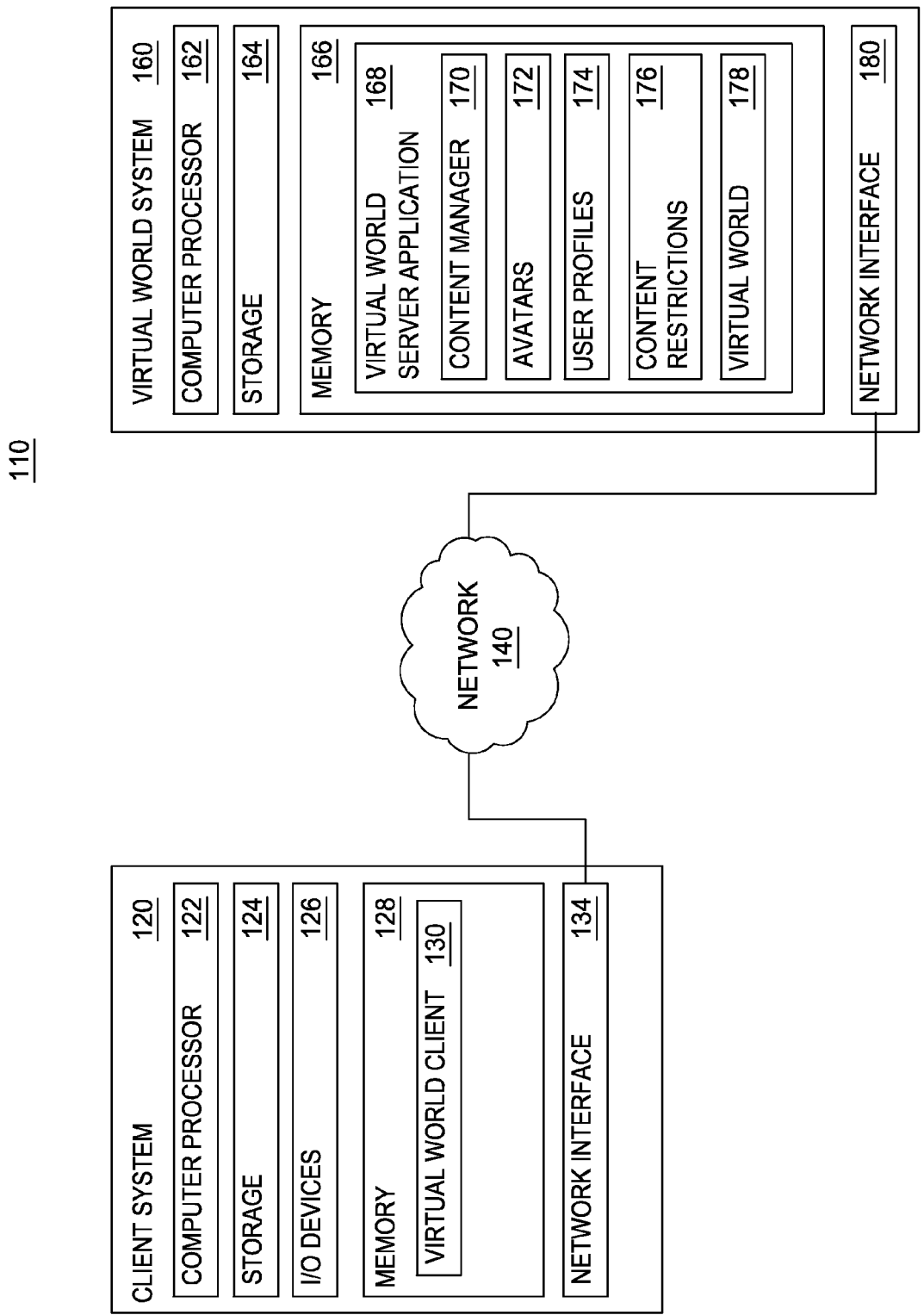

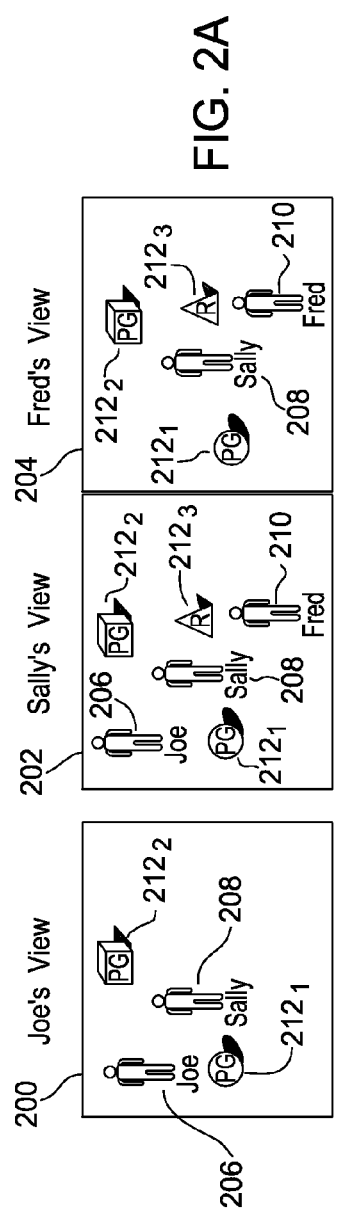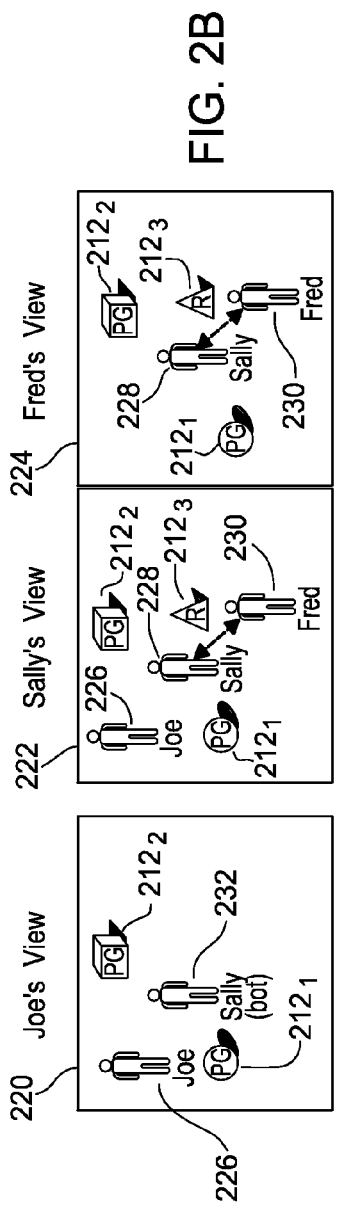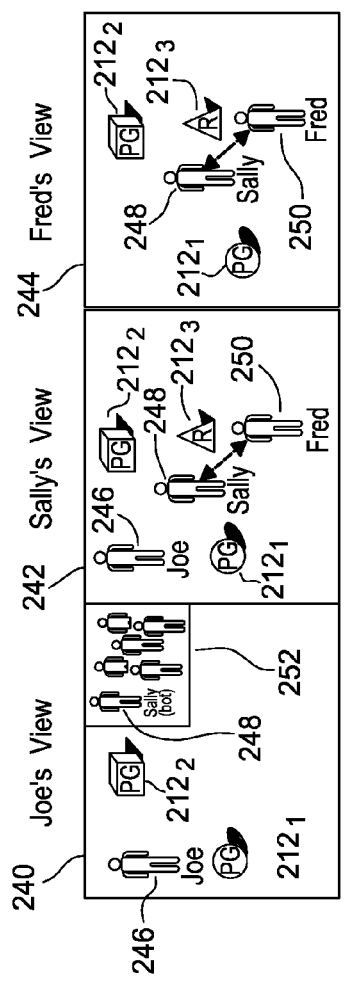

DYNAMICALLY DEPICTING INTERACTIONS IN A VIRTUAL WORLD BASED ON VARIED USER RIGHTS

CROSS-REFERENCE TO RELATED APPLICATIONS

This application claims benefit of U.S. provisional patent application Ser. No. 61/239,615, filed Sep. 3, 2009, which is herein incorporated by reference in its entirety.

BACKGROUND

Embodiments of the invention relate to managing interactions between users in a virtual world.

A virtual world is a simulated environment which may be inhabited by users. The users may interact with virtual objects and locations throughout the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another.

Virtual worlds are said to provide an immersive environment, as they typically appear similar to the real world. Virtual environments, complete with avatars and virtual items, are typically presented as images on a display screen. Furthermore, objects in the virtual world tend to follow rules related to gravity, topography, locomotion, physics and kinematics. Of course, virtual worlds can suspend or alter these rules as well as provide other imaginative or fanciful environments. Additionally, current techniques exist for creating content restrictions for online interactions (e.g., a language filter that masks any vulgar words). However, such content restrictions are often rigid and ill-suited for use in increasingly dynamic and diverse virtual worlds.

SUMMARY

Embodiments of the invention provide a computer-implemented method, system and computer program product for dynamically depicting interactions in a virtual world. The computer-implemented method, system and computer program product include receiving one or more content restrictions associated with a first user of the virtual world. Additionally, the computer-implemented method, system and computer program product include analyzing an activity history for a second user in the virtual world. The computer-implemented method, system and computer program product further include selectively blocking interactions between the first user and the second user in the virtual world, based at least in part on the received content restrictions for the first user and the analyzed activity history for the second user, and by operation of one or more computer processors.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B are block diagrams of a networked computer system configured to manage interactions in a virtual world, according to embodiments of the invention.

FIGS. 2A-2C are exemplary screenshots of interactions in a virtual world, according to embodiments of the invention.

DETAILED DESCRIPTION

Figure 1A:
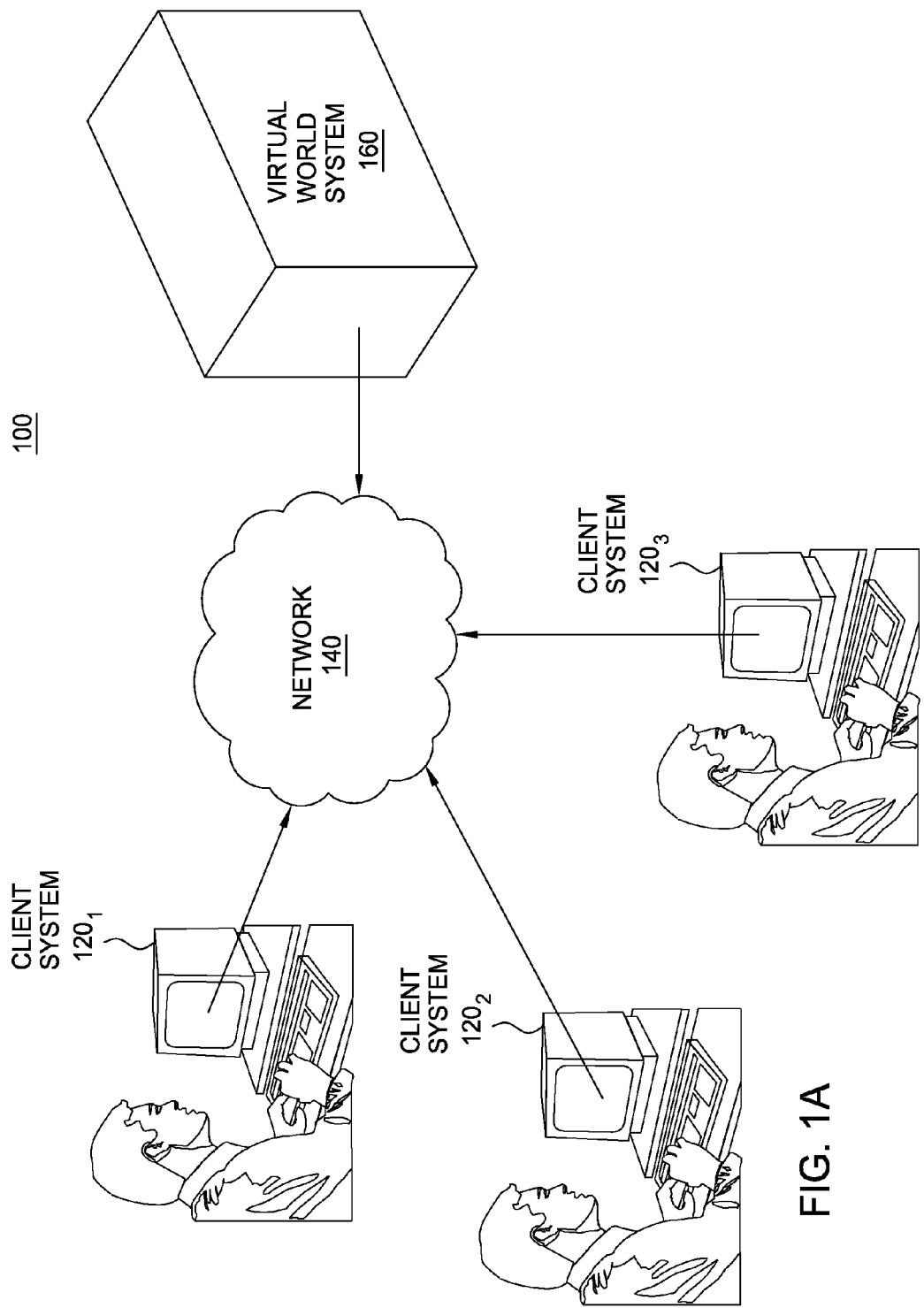

Embodiments of the invention generally restrict user interactions in a virtual world based on one or more content restrictions associated with a user. More particularly, embodiments of the invention may receive one or more content restrictions associated with a first user of a virtual world, and may further analyze the activity history of a second user in the virtual world. The activity history may include the behavior of the second user in the virtual world, locations in the virtual world visited by the second user, and/or content viewed by the second user in the virtual world. Embodiments of the invention may then determine what, if any, interactions are permitted between the first user and the second user in the virtual world, based on the content restrictions associated with the first user and the activity history of the second user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the virtual world) or related data available in the cloud. For example, the virtual world server application could execute on a computing system in the cloud and accept requests from users to access the virtual world. In such a case, the virtual world server application could receive one or more content restrictions for a first user of the virtual world and store the content restrictions at a storage location in the cloud. The virtual world server application could then manage interactions between the first user and other users of the virtual world based on the content restrictions and profiles generated for the other users. Doing so allows a user to safely interact and communicate with other users in the virtual world from any computing system attached to a network connected to the cloud (e.g., the Internet).

Referring now to FIGS. 1A-1B, FIGS. 1A-1B are block diagrams of a networked computer system configured to manage interactions in a virtual world, according to embodiments of the invention. More specifically, FIG. 1A is a block diagram of a networked system configured to manage interactions in a virtual world, according to one embodiment of the invention. As shown, the system 100 includes three client systems 120, a network 140, and a virtual world system 160. The client systems 120 may include a virtual world client application and the virtual world system 160 may include a virtual world server application. The virtual world client on the client system 120 may connect to the virtual world server on the virtual world system 160 using the network 140. Upon establishing a connection, the client may display a visual representation of the virtual world, including any avatars, items and any interactions therebetween occurring in the virtual world.

Generally, once connected to the virtual world server, users of the client systems 120 may interact with each other in the virtual world. For example, a first user of client system 120₁ and a second user of client system 120₂ may interact through their respective avatars in the virtual world. Such an interaction may include a communication between the two users (e.g., a textual or voice chat message). As another example, an exemplary interaction may be performing an activity together in the virtual world (e.g., fighting a virtual monster together). Continuing the example, the users of client systems 120₁ and 120₂ may be joined by a third user connecting to the virtual world server using client system 120₃. Although these examples (and other examples included herein) include two or three users, one of ordinary skill in the art will quickly recognize that these examples are for illustrative purposes only, and embodiments of the invention may extend to any number of users interacting in a virtual world.

While interacting with other users and virtual objects in the virtual world, users may wish to not be exposed to certain content of the virtual world. For example, a user may wish not to see any language deemed vulgar while interacting with other users in the virtual world. As a second example, a fifteen year old user of the virtual world may wish to only interact with other users in the virtual world who are 16 years old or younger. As yet another example, a user of the virtual world may wish to only see content in the virtual world that is rated PG-13 or lower. For each of these examples, a content restriction may be created in order to restrict the content that the user may view and interact with in the virtual world. Additionally, each user of the virtual world may be associated with one or more content restrictions. A user may create a content restriction for himself (e.g., if the user does not wish to see or hear any vulgar language while interacting in the virtual world). Alternatively, a person of authority for the user (e.g., the user's parents) may create the content restriction for the user.

Once the content restriction is created and associated with a user, a content manager on the virtual world system may limit what content of the virtual world will be displayed for the user. As an example, the content manager may restrict what areas of the virtual world the user may travel to (e.g., using an avatar). Additionally, the content manager may associate a rating with each user of the virtual world. For purposes of this example, assume the content manager uses ratings "G", "PG-13" and "R", where "G" is the most permissive rating, while "R" is the most restrictive (i.e., adult-only content) rating. The rating associated with a user may be based generally on the user's conduct in the virtual world. For example, if a particular user frequents adult-only areas of the virtual world, the content manager may associate the user with an R rating. Exemplary factors that may influence a user's rating include, without limitation, what actions the user performs in the virtual world, whether the user uses vulgar language in the virtual world, and other users the user associates with in the virtual world. Furthermore, although certain embodiments of the invention are described herein using the ratings "G", "PG", "PG-13" and "R", these ratings are used for illustrative purposes only. Of course, one of ordinary skill in the art will quickly realize that such an example is without limitation, and that generally any rating system capable of performing the functions described herein may be used instead.

According to embodiments of the invention, if a first user of the virtual world is associated with a content restriction that prohibits any R-rated content, the content manager may block any interactions in the virtual world between the first user and any other users with an R rating. Furthermore, the content manager may prevent the first user from seeing an R-rated user's avatar in the virtual world, and may likewise prevent the R-rated user from seeing the first user's avatar in the virtual world. In this way, embodiments of the invention not only prevent the first user from viewing any R-rated content in the virtual world, but also prevent any users associated with an R-rating from even seeing the first user, thus preventing interaction (either directly or indirectly) between the two users.

FIG. 1B is a block diagram of a networked system configured to manage interactions in a virtual world, according to one embodiment of the invention. As shown, the system 110 includes a client system 120 and a virtual world system 160, both connected to the network 140. The client system 120 contains a computer processor 122, storage media 124, I/O devices 126, memory 128 and a network interface 134. Computer processor 122 may be any processor capable of performing the functions described herein. I/O devices 126 may represent a variety of input and output devices, including keyboards, mice, visual displays, printers and so on. The client system 120 may connect to the network 140 using the network interface 134. Furthermore, as will be understood by one of ordinary skill in the art, any computer system capable of performing the functions described herein may be used. Furthermore, although the depicted embodiment only a single client system connecting to the virtual world 160 via the network 140, such a depiction is for illustrative purposes only, and one of ordinary skill in the art will quickly recognize that any number of client systems 120 may connect to any number of virtual world systems 160.

In the pictured embodiment, memory 128 contains a virtual world client 130. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The virtual world client 130 may generally connect to a virtual world server. Once connected to the server, the virtual world client 130 may output a representation of the virtual world for display (e.g., using an I/O device 126, such as a monitor). In one embodiment of the invention, the memory 128 of the client system 120 also contains one or more content restrictions (similar to content restrictions 176) regulating a user's interactions in the virtual world.

The virtual world system 160 contains a computer processor 162, storage media 164, memory 166 and a network interface 180. Computer processor 162 may be any processor capable of performing the functions described herein. The virtual world system 160 may connect to the network 140 using the network interface 180. Furthermore, as will be understood by one of ordinary skill in the art, any computer system capable of performing the functions described herein may be used. Additionally, although memory 166 is shown as a single entity, memory 128 may include one or more memory devices having blocks of memory associated with physical addresses, such as random access memory (RAM), read only memory (ROM), flash memory or other types of volatile and/or non-volatile memory.

In the pictured embodiment, memory 166 contains a virtual world server application 168. The server application 168 contains a content manager 170, avatars 172, user profiles 174, content restrictions 176 and a virtual world 178. The avatars 172 generally represent a user's persona in the virtual world. While avatars 172 are often created to take a humanoid shape, this is not always the case. The avatars 172 may be created in any shape or form capable of performing the functions described herein. Furthermore, although the avatars 172, user profiles 174, content restrictions 176 and virtual world 178 are shown as contained in memory 166, they may reside elsewhere on the virtual world system 160 (e.g., storage media 164) or on another system.

Each user profile 174 may generally specify a content rating for a user of the virtual world server application 168. As discussed above, a user's content rating may be influenced by, for example, the user's use of vulgar language in the virtual world, the locations in the virtual world the user frequents, and which other users the user associates with in the virtual world. Additionally, as discussed above, the content restrictions 176 may specify prohibited content for a user of the virtual world server application 168.

Generally, the virtual world server application 168 may manage the virtual world 178. For example, the virtual world server application 168 may accept a connection from a user (e.g., using network 140 and network interface 180). The virtual world server application 168 may associate the user with an avatar 172 (e.g., based on the user's authentication credentials). For example, upon logging into an account with the virtual world server application 168 through the virtual world client 130, the user may be associated with an avatar 172 based on the user's account information. In another embodiment, the avatar 172 for the user may be received from the user's virtual world client 130. In yet another embodiment, the user may create the avatar 172 upon connecting to the server application 168 through the client 130.

Once the connection is established, the user's virtual world client 130 may display a representation of the virtual world 178 (e.g., using an I/O device 126, such as a monitor). The representation may be influenced by the user's avatar's 172 current location in the virtual world 178. Such a representation may include the terrain of the virtual world 178, as well as any virtual items and other avatars 172 existing in the virtual world 178. For example, if the user's avatar and a second avatar are in the same location in the virtual world 178, the virtual world client 130 may display the second avatar to the user.

FIGS. 2A-2C are exemplary screenshots of interactions in a virtual world, according to embodiments of the invention. Generally, the exemplary screenshots shown in FIGS. 2A-2C depict the virtual world from the point of view of three different users. For purposes of this example, assume that the content manager 170 uses a rating system that rates content as either "G", "PG", "PG-13" or "R", with G being the most permissive content rating and R being a restrictive, adult-only content rating. As discussed above, a user's rating may be influenced by, for example, locations in the virtual world the user frequents, whether the user uses any vulgar language in the virtual world, activities in the virtual world the user takes part in, and other users the user associates with in the virtual world. Additionally, assume that the user Joe has a rating of PG, Sally has a rating of PG-13, and Fred has a rating of R. Furthermore, in the depicted examples, assume that the user Joe is associated with a content restriction that prevents him from interacting with any users in the virtual world that have an R rating. In one embodiment of the invention, such a content restriction may be created by Joe himself. In another embodiment, the content restriction may be created by someone with supervisory authority for Joe (e.g., Joe's parents). In yet another embodiment, the content restriction may be a default setting of the virtual world client 130 that the user must actively disable in order to view R-rated content.

As shown, FIG. 2A shows three exemplary screenshots of a virtual world from three different points of view, according to one embodiment of the invention. More particularly, the FIG. 2A shows the virtual world 178 from three different perspectives: the user Joe's point of view 200, the user Sally's point of view 202 and the user Fred's point of view 204. The scene depicted in each of the screenshots 200, 202 and 204 includes the avatars of users Joe, Sally and Fred standing in close proximity to each other and to several virtual objects in the virtual world. In this example, each user's point of view represents how they would view the virtual world 178 (e.g., using the virtual world client 130).

As shown, in the screenshot 200 showing the virtual world 178 from Joe's point of view, the scene contains Joe's avatar 206, Sally's avatar 208 and two virtual objects $212_1$ and $212_2$ in the virtual world. Here, because the content restriction 176 associated with Joe allows him to only see content in the virtual world that has a G, PG or PG-13 rating, Joe is only able to see his own avatar 206 and Sally's avatar 208. Thus, generally, the content restriction associated with Joe only allows Joe to interact with content that has a restriction rating equal to or lower than the specified rating (i.e., in this example, PG-13). As such, Joe will not be able to see Fred's avatar because of Fred's R rating. Furthermore, because of the content restriction, Joe is only able to see the virtual objects that meet the requirements of the content restriction. As such, when Joe views the virtual world in this example, he will only see the objects $212_1$ and $212_2$, which the content manager 170 has rated PG. Thus, although there are other objects (e.g., R-rated object $212_3$) and avatars (e.g., Fred's avatar 210) present in the virtual world at the depicted location, these objects and avatars are not visible when the virtual world is shown from Joe's point of view because they are prohibited by Joe's content restriction.

In another embodiment of the invention, rather than not seeing Fred's avatar in the virtual world, the content manager 170 may replace Fred's avatar with a censored version of the avatar, when the virtual world is viewed from Joe's perspective. For example, the content manager 170 may restrict all communication and interaction between Fred and Joe, and may replace Fred's avatar with a default avatar. Continuing this example, the content manager 170 may prevent Joe from seeing any actions performed by the default avatar, but would only know that some sort of blocked content was present. Such an embodiment is advantageous, for example, in a virtual world that enforces collision detection between avatars. In such a virtual world, if avatars were present but not displayed because of a content restriction, users may experience invisible objects in the virtual world due to the collision detection. In an alternate embodiment, the content manager 170 may disable collision detection in the virtual world for users that are disallowed due to a content restriction. Thus, in this alternate embodiment, the content manager 170 may prevent users from viewing disallowed content, and users would not be faced with the situation where their avatars collide with the invisible avatars of disallowed users.

The screenshot 202 shows the same scene in the virtual world from Sally's point of view. As discussed above, in this example Sally is rated PG-13 and is not associated with any content restriction. Thus, because Sally does not violate anyone else's content restriction, and no one else violates a content restriction associated with Sally, the screenshot 200 shows all three avatars 206, 208 and 210 in the virtual scene, as well as every object 212 in the virtual scene. That is, in contrast to the screenshot 202, Sally is able to view the R-rated content of the virtual scene, including the object $212_3$ and Fred's avatar 210.

The screenshot 204 shows yet another point of view of the same virtual scene, and more particularly, shows the virtual scene from the user Fred's point of view. Here, Fred is not associated with any content restriction, and thus is able to view all three objects 212 in the scene, including the R-rated object $212_3$. However, because the content manager 170 has assigned Fred an R-rating, Fred's avatar violates the content restriction associated with user Joe. As such, just as the content manager 170 prevented Joe from seeing Fred's avatar 210, the content manager 170 likewise prevents Fred from seeing Joe's avatar 206.

Advantageously, embodiments of the invention may enforce content restrictions by not only preventing the first user associated with the content restriction (e.g., Joe) from viewing prohibited content (e.g., R-rated avatars and objects in the virtual world), but may also prevent any users that violate the content restriction (e.g., Fred) from viewing the first user. This is advantageous, because if the prohibited user (e.g., Fred) could still see the first user (e.g., Joe), it may be possible for the prohibited user to still interact with the first user. By ensuring that the users who violate the content restriction cannot even view the first user, embodiments of the invention minimize any potential interactions between the first user and prohibited users, which may in turn provide better protection and an improved experience in the virtual world for the first user.

FIG. 2B shows three exemplary screenshots of a virtual world from three different points of view, according to one embodiment of the invention. More particularly, the FIG. 2A shows the virtual world 178 from three different perspectives: the user Joe's point of view 200, the user Sally's point of view 202 and the user Fred's point of view 204. The scene depicted in each of the screenshots 220, 222 and 224 includes the avatars of users Joe, Sally and Fred standing in close proximity to each other and to several virtual objects in the virtual world. More specifically, the scene depicts Sally's avatar having some sort of interaction with Fred's avatar. In this example, each user's point of view represents how they would view the virtual world 178 (e.g., using the virtual world client 130).

The screenshot 220 shows the virtual scene from the user Joe's point of view. The screenshot 220 includes Joe's avatar 226, Sally's avatar 232 performing a bot animation and two virtual objects $212_1$ and $212_2$ in the virtual world. Here, similar to the discussion related to FIG. 4A, because the content restriction 176 associated with Joe allows him to only see content in the virtual world that has a PG or PG-13 rating, Joe is only able to see his own avatar 206 and Sally's avatar 208. Furthermore, because of the content restriction, Joe is only able to see the virtual objects that meet the requirements of the content restriction. As such, when Joe views the virtual world in this example, he will only see the objects $212_1$ and $212_2$, which the content manager 170 has rated PG. Thus, although there are other objects (e.g., R-rated object $212_3$) and avatars (e.g., Fred's avatar 210) present in the virtual world at the depicted location, these objects and avatars are not visible when the virtual world is shown from Joe's point of view because they are prohibited by Joe's content restriction.

Generally as used herein, a bot or bot script refers to a series of actions to automate an avatar in a virtual world. The actions performed by the bot script may be general actions (e.g., sitting down after a period of inactivity), or may be specifically related to the avatar's current surroundings in the virtual world. In one embodiment of the invention, the bot script may be automatically invoked in certain situations. Thus, for example, a user may wish to use a bot script to make her avatar dance when she's busy in a night club, and another script to make her eat or drink when she's busy in a restaurant, and still yet another script to show her talking on a virtual cell phone as she's walking down the street in the virtual world. Additionally, a user may create a bot script to have her avatar portray certain facial expressions or emotions when encountering other particular users in the virtual world. Thus, for example, the user Sally may create a bot script to have her avatar automatically smile and wave when encountering Joe's avatar.

Thus, when a first user (e.g., Joe) is viewing an avatar that is interacting with a prohibited avatar, rather than showing the avatar interacting with nothing, embodiments of the invention may be configured to show the avatar performing actions according to a bot script. Thus, returning to the current example, when Joe views Sally's avatar 232 (who, in this example, is interacting with the prohibited user Fred's avatar), Joe will see Sally's avatar 232 performing one or more actions according to Sally's bot script. Thus, if the depicted scene in the virtual world is a nightclub, Joe may view Sally's avatar 232 as dancing on a virtual dance floor while Sally is interacting with Fred's avatar. Once Sally finishes interacting with the disallowed user Fred, the content manager 170 may stop the bot script, at which point Sally's avatar will be available for Joe to interact with. In one embodiment of the invention, the content manager 170 is configured to stop the actions specified in the bot script gradually after a specified time. Thus, for example, Joe may see Sally's avatar continue dancing according to her bot script until the current song being played in the virtual nightclub ends, and then see Sally's avatar gradually walk off the dance floor.

The screenshot 222 shows the same virtual scene from Sally's point of view. As discussed above, in this example Sally is rated PG-13 and is not associated with any content restriction. Thus, because Sally does not violate anyone else's content restriction, and no one else violates a content restriction associated with Sally, the screenshot 222 shows all three avatars 226, 228 and 230 in the virtual scene, as well as every object 212 in the virtual scene. That is, in contrast to the screenshot 220, Sally is able to view the R-rated content of the virtual scene, including the object $212_3$ and Fred's avatar 230. Thus, in the depicted example, Sally sees her avatar 228 and Fred's avatar 230 interacting, with no bot scripts being invoked.

The screenshot 224 shows yet another point of view of the same virtual scene, and more particularly, shows the virtual scene from the user Fred's point of view. Here, Fred is not associated with any content restriction, and thus is able to view all three objects 212 in the scene, including the R-rated object $212_3$. However, because the content manager 170 has assigned Fred an R-rating, Fred's avatar violates the content restriction associated with user Joe. As such, just as the content manager 170 prevented Joe from seeing Fred's avatar 230, the content manager 170 likewise prevents Fred from seeing Joe's avatar 226. Thus, in the depicted example, Fred sees his avatar 230 and Sally's avatar 228 interacting, with no bot scripts being invoked.

FIG. 2C shows three exemplary screenshots of a virtual world from three different points of view, according to one embodiment of the invention. Similar to FIGS. 2A and 2B, the FIG. 2C shows the virtual world 178 from three different perspectives: the user Joe's point of view 240, the user Sally's point of view 242 and the user Fred's point of view 244. The scene depicted in each of the screenshots 240, 242 and 244 includes the avatars of users Joe, Sally and Fred standing in close proximity to each other and to several virtual objects in the virtual world. More specifically, the scene depicts Sally's avatar having some sort of interaction with Fred's avatar. In this example, each user's point of view represents how they would view the virtual world 178 (e.g., using the virtual world client 130).

The screenshot 240 shows the virtual scene from the user Joe's point of view. The screenshot 240 includes Joe's avatar 246, Sally's avatar 248 encapsulated by a ghost box 252, and two virtual objects 212₁ and 212₂ in the virtual world. Here, similar to the discussion related to FIGS. 4A and 4B, because the content restriction 176 associated with Joe allows him to only see content in the virtual world that has a PG or PG-13 rating, Joe is only able to see his own avatar 246 and Sally's avatar 248. Furthermore, because of the content restriction, Joe is only able to see the virtual objects that meet the requirements of the content restriction. As such, when Joe views the virtual world in this example, he will only see the objects 212₁ and 212₂, which the content manager 170 has rated PG. Thus, although there are other objects (e.g., R-rated object 212₃) and avatars (e.g., Fred's avatar 250) present in the virtual world at the depicted location, these objects and avatars are not visible when the virtual world is shown from Joe's point of view because they are prohibited by Joe's content restriction.

As used herein, a ghost box 252 refers to a container in a virtual world that may encapsulate one or more avatars. While in one embodiment the ghost box 252 is represented by a cube-shaped object in the virtual world, of course other shapes may be used instead. Generally, when a visible avatar is interacting with a disallowed avatar or object, embodiments of the invention may be configured to display the visible avatar inside a ghost box 252 to indicate that the visible avatar is interacting with undisplayable content. In the current example, when the scene is viewed from Joe's point of view (as in screenshot 240), because Sally is interacting with Fred (i.e., a disallowed user because of his R-rating), Joe will see Sally's avatar 248 encapsulated by a ghost box 252, but will not see any actions being performed by Sally's avatar or who her avatar is interacting with.

Furthermore, while the ghost box 252 may show the outlines of various other avatars as well, embodiments of the invention may be configured to only display the outlines of these avatars and not any details about them (e.g., the look of their avatar, their current actions, their name in the virtual world, etc.). Furthermore, the ghost box 252 may be displayed as always showing a fixed number of outlines of other avatars, regardless of the number of avatars actually interacting with each other. Thus, in the current example, although the ghost box 252 shows Sally's avatar 248 and the outlines of 5 other avatars, Sally is actually only interacting with one prohibited avatar (e.g., Fred). In one embodiment of the invention, Sally's avatar 248 in the ghost box 252 may be displayed (according to Joe's point of view) as performing one or more actions specified by Sally's bot script. Once Sally finishes interacting with the disallowed user Fred, the content manager 170 may remove the ghost box 252 from around Sally's avatar 248, at which point Sally's avatar will be available for Joe to interact with.

The screenshot 222 shows the same virtual scene from Sally's point of view. As discussed above, in this example Sally is rated PG-13 and is not associated with any content restriction. Thus, because Sally does not violate anyone else's content restriction, and no one else violates a content restriction associated with Sally, the screenshot 242 shows all three avatars 246, 248 and 250 in the virtual scene, as well as every object 212 in the virtual scene. That is, in contrast to the screenshot 240, Sally is able to view the R-rated content of the virtual scene, including the object 212₃ and Fred's avatar 250. Thus, in the depicted example, Sally sees her avatar 248 and Fred's avatar 250 interacting, with no ghost boxes 252 surrounding them, and no bot scripts being invoked.

The screenshot 244 shows yet another point of view of the same virtual scene, and more particularly, shows the virtual scene from the user Fred's point of view. Here, Fred is not associated with any content restriction, and thus is able to view all three objects 212 in the scene, including the R-rated object 212₃. However, because the content manager 170 has assigned Fred an R-rating, Fred's avatar violates the content restriction associated with user Joe. As such, just as the content manager 170 prevented Joe from seeing Fred's avatar 250, the content manager 170 likewise prevents Fred from seeing Joe's avatar 246. Thus, in the depicted example, Fred sees his avatar 250 and Sally's avatar 248 interacting, with no ghost boxes 252 surrounding them, and no bot scripts being invoked.

Figure 3:
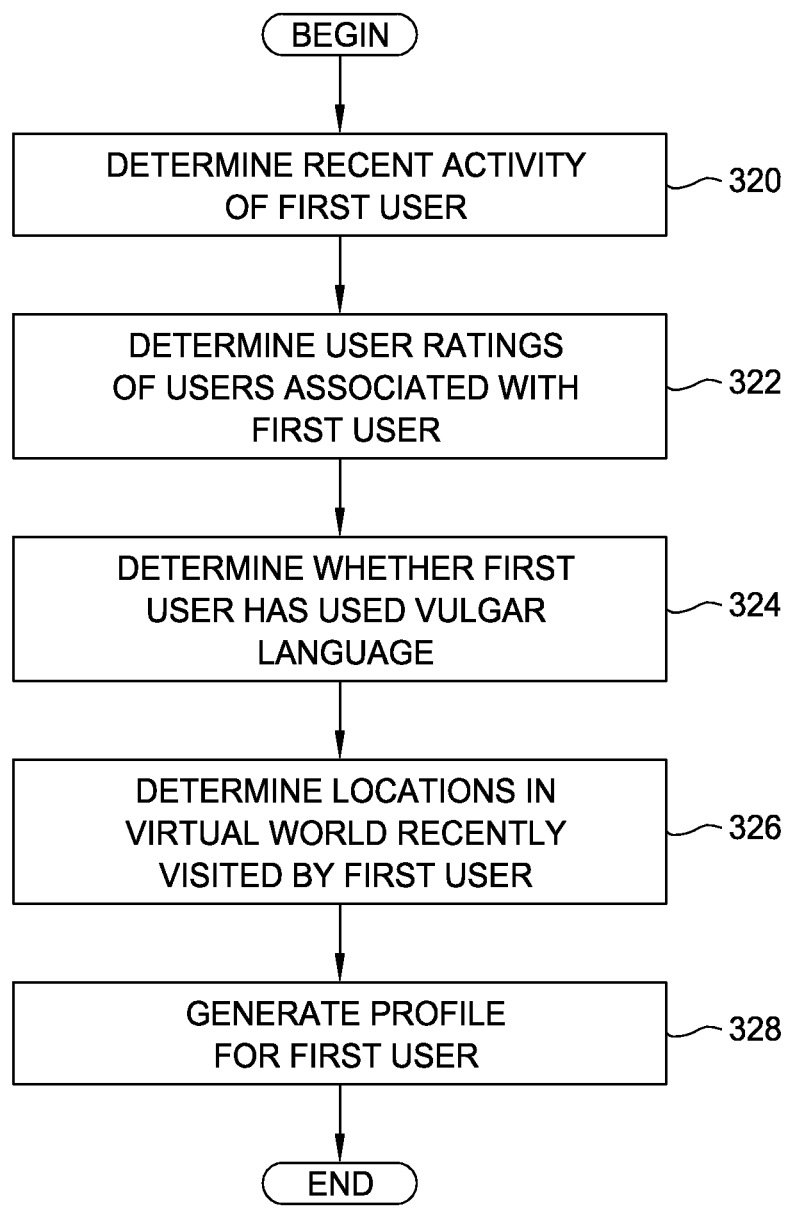
FIG. 3 is a flow diagram illustrating a method of generating a profile for a user, according to one embodiment of the invention.

FIG. 3 is a flow diagram illustrating a method of generating a profile for a user, according to one embodiment of the invention. As shown, the method 300 begins at step 320, where the content manager 170 determines the recent activity of a first user of the virtual world. The content manger 170 then determines which other users of the virtual world the first user has interacted with, and further determines a user rating for each of these other users (step 322). In one embodiment of the invention, the content manager 170 determines which other users the first user has interacted with in the virtual world within a specified period of time. For example, the content manager 170 may look only at interactions that took place in the virtual world within the last 90 days.

According to one embodiment of the invention, the content manger 170 may further evaluate interactions between users to identify interaction trends between users of the virtual world. Upon identifying an interaction trend, the content manager 170 may then notify users (or their parents) of potential concerns. For example, if a user Sally, who the content manager has assigned a content rating of PG-13, has been spending a lot of time with the user Fred, who has a content rating of R, the content manager 170 may identify this as an interaction trend. Furthermore, assume that a third user Joe has a rating of PG and is associated with a content restriction prohibiting him from interacting with any R-rated content. If Joe then interacts with Sally, the content manager 170 may notify Joe's parents of the identified trend involving Sally frequently interacting with R-rated users, even though Sally's personal content rating does not violate the content restriction. Furthermore, in one embodiment of the invention, the content manager 170 may determine that Sally herself should be assigned an R content rating, because of her frequent interaction with R-rated users in the virtual world.

The content manger 170 then determines whether the first user has used any vulgar language in the virtual world (step 324). In one embodiment of the invention, the content manager 170 determines whether the first user has used any vulgar language within a period of time (e.g., past 90 days). In another embodiment of the invention, the content manager 170 further determines a severity of the first user's use of vulgar language. The severity may be based on an amount of vulgar language used by the first user. Additionally, the severity may be based on which vulgar words the first user used in the virtual world (i.e., some words may be construed as "worse" than other words).

The content manager 170 then determines which locations the first user has visited in the virtual world (step 326). That is, according to one embodiment of the invention, different areas of the virtual world 178 may be associated with different content ratings. For example, the content manager 170 may determine that a particular virtual nightclub is associated with an R content rating, but may determine that a virtual park is associated with a PG content rating. The content manager 170 may further use these location ratings to determine a rating for a user's avatar in the virtual world. For example, if the user Fred frequently visits the R-rated nightclub, the content manager 170 may associate Fred's avatar with an R-rating. Of course, such a determination may be made based on any number of other factors as well, what the user does at the location, including how frequently a user visits the particular location, how recently the user has visited the location, and so on.

Once the content manager 170 determines which locations the first user has visited, the content manger 170 generates a user profile for the first user (step 328). In the depicted example, the user profile may be based on all of the information determined in steps 320-326. Of course, one of ordinary skill in the art will quickly realize that other combinations of these factors, as well as other related factors may be used instead. Generally, embodiments of the invention may look at any action associated with a user to determine a content rating for the user. For example, in generating a content rating for a user, embodiments of the invention may determine whether the user has viewed or contributed any obscene or adult-oriented media (e.g., images, videos, etc.) in the virtual world. The content manger 170 may then use the generated profile to assign a content rating to the users of the virtual world system 160.

Figure 4:
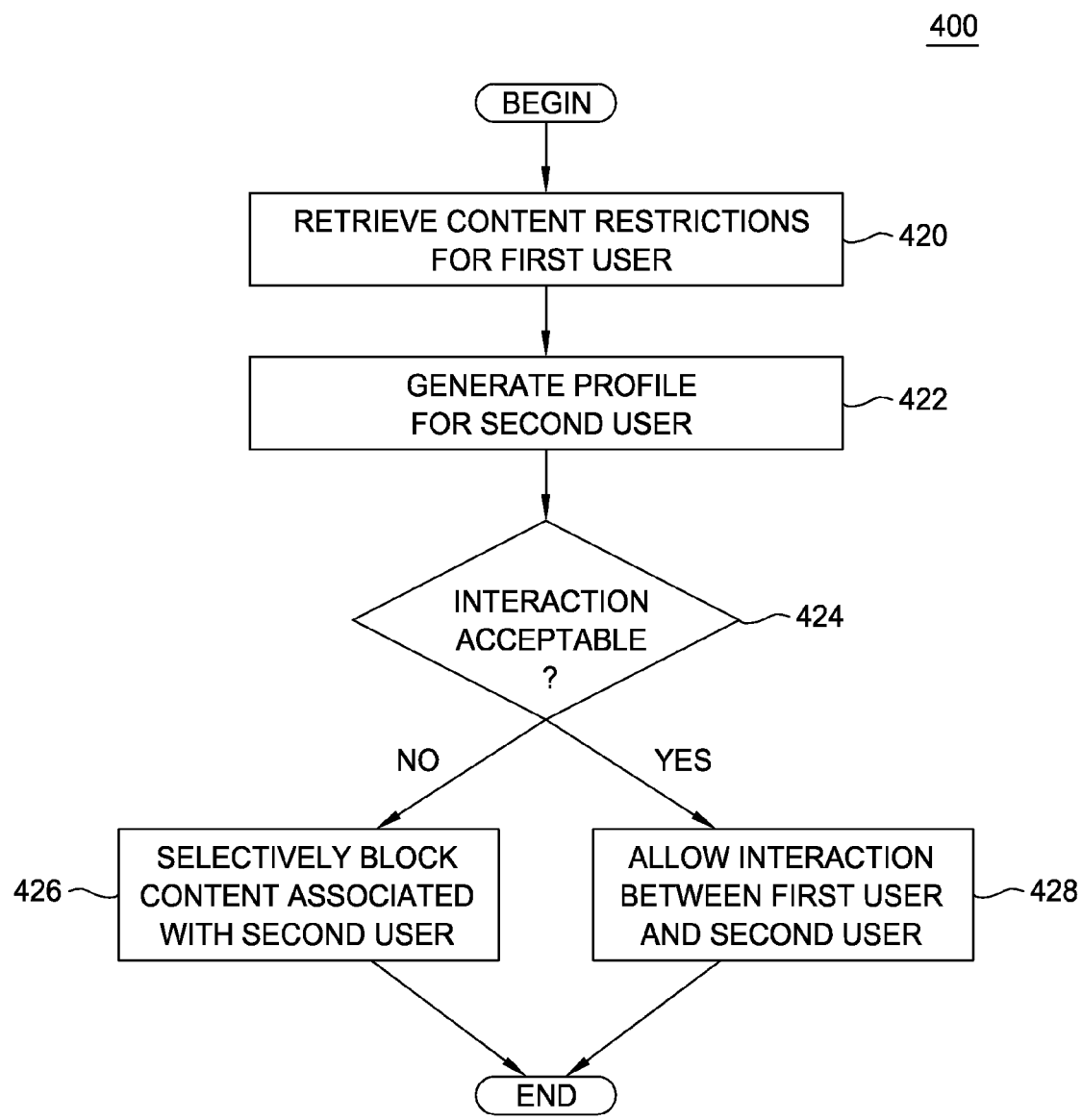
FIG. 4 is a flow diagram illustrating a method of managing interactions in a virtual world, according to one embodiment of the invention.

FIG. 4 is a flow diagram illustrating a method of managing interactions in a virtual world, according to one embodiment of the invention. As shown, the method 400 begins at step 420, where the content manager 170 retrieves content restrictions associated with a first user of the virtual world. Once the content restrictions for the first user are retrieved, the content manager 170 generates a profile for the second user of the virtual world (step 422). In one embodiment of the invention, the profile is generated using the method 300 discussed above. Of course, one of ordinary skill in the art will recognize that any method of generating a profile having the characteristics described herein may be used instead.

Once the profile is generated, the content manger 170 determines whether interaction between the first user and the second user is acceptable, based on the content restrictions 176 associated with the first user and the profile generated for the second user (step 424). As an example, assume that the content manager assigns content in the virtual world a "G", "PG", "PG-13" or "R" rating. Furthermore, assume that a first user is associated with a content restriction 176 prohibiting all PG-13 and R-rated content. Thus, in this example, if the content manager 170 determines that, based on a profile generated for a second user, that the second user has an R rating, the content manager 170 may determine that interaction between the first user and the second user is unacceptable, because such interaction would violate the content restriction 176 associated with the first user.

As a second example, assume that the content manager assigns content in the virtual world a rating of 1 to 10, where 1 is the most generally acceptable content, and 10 is the most adult-oriented content. Furthermore, assume that a first user of the virtual world is associated with a content restriction 176 prohibiting all content rated 5 or higher. If the content manager 170 determines that the second user, based on a profile generated for the second user, has a content rating of 4, the content manager 170 may then determine that interaction between the first user and the second user is acceptable. That is, the content manger 170 may determine the interaction is acceptable in this example, because interaction between the first user and a user with a rating of 4 would not violate the content restriction 176 (i.e., interactions with content rated 5 or higher are prohibited).

If the content manager 170 determines the interaction is acceptable, the content manager 170 allows interaction to take place between the first user and the second user in the virtual world (step 428). If instead the content manager 170 determines the interaction between the first user and the second user is unacceptable, the content manager 170 selectively blocks content associated with the second user on the first user's client, and vice versa (step 426). Once the content is blocked, or once the interaction takes place between the first user and the second user, the method 400 ends.

As discussed above, in addition to blocking interactions between the first user and the second user, the content manager 170 may also display users interacting with a disallowed user in different ways. For example, in one embodiment of the invention, the content manager 170 may display the allowed user performing actions according to a bot script, while the allowed user is interacting with a disallowed user. As a second example, in a second embodiment of the invention, the content manger 170 may display the allowed user encapsulated by a ghost box while the allowed user is interacting with the disallowed user. In this way, the disallowed user is not only hidden from the first user (and vice versa), but interactions between the disallowed user and other allowed users may be handled in a way that improves the feel of the virtual world. That is, rather than showing an allowed user interacting with a hidden party (i.e., the disallowed user) in the virtual world, which may be confusing to the first user, embodiments of the invention may improve the look and feeling of the virtual by showing the allowed user performing a contextually appropriate action instead (e.g., an action specified in the allowed user's bot script).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for dynamically depicting interactions in a virtual world, comprising:
    accessing one or more content rules defining unacceptable content for a first user of the virtual world, wherein the one or more content rules specify at least one unacceptable content rating corresponding to content too mature for the first user of the virtual world, wherein the unacceptable content rating is selected from a plurality of predefined maturity ratings for the virtual world;
    analyzing, by operation of one or more computer processors, an activity profile for a second user in the virtual world to assign a maturity rating, selected from the plurality of predefined maturity ratings for the virtual world, to the second user, wherein the activity profile describes (i) how recently the second user visited a first location, and (ii) one or more actions taken by the second user at the first location;

upon determining that the assigned rating for the second user matches one of the at least one unacceptable content ratings defined for the first user, selectively blocking interactions between the first user and the second user in the virtual world as being too mature for the first user; and upon determining that a third user is interacting with the second user within the virtual world:
  selectively limiting interactions between the first user and the third user in the virtual world; and
  controlling, for a virtual world client corresponding to the first user, a series of actions performed by an avatar corresponding to the third user according to a bot script, rather than based on inputs received from the third user, wherein the series of actions performed by the avatar corresponding to the third user are controlled based on the inputs received from the third user when viewed from a virtual world client of at least one other user of the virtual world.

2. The method of claim 1, wherein analyzing the activity profile comprises assigning a content rating to one or more activities in the activity profile.

3. The method of claim 1, further comprising selectively displaying objects to the first user based at least in part on a comparison between the one or more content rules for the first user and the activity profile associated with the second user.

4. The method of claim 3, further comprising selectively displaying objects to the second user based at least in part on a comparison between the one or more content rules associated with the first user and the activity profile associated with the second user.

5. The method of claim 4, further comprising:
  upon detecting that third user is interacting with the virtual world in a manner inconsistent with the one or more content rules for the first user, and associating a busy indicator with the third user.

6. The method of claim 5, further comprising alerting a parent of the first user, based at least in part on a comparison between the control filter associated with the first user and the activity profiles associated with the second user and the third user.

7. The method of claim 5, further comprising altering an avatar associated with the third user.

8. The method of claim 1, further comprising:
  analyzing additional activity history of the second user in the virtual world; and
  dynamically updating the activity profile for the second user, based on the analyzed additional activity history of the second user in the virtual world.

9. The method of claim 1, wherein the activity profile for the second user is based in part on a percentage of time spent performing general activities and a percentage of time spent performing adult-only activities.

10. The method of claim 1, wherein the activity profile for the second user specifies a frequency of use of vulgar language by the second user.

11. A system, comprising:
  a computer processor; and
  a memory containing a program that, when executed on the computer processor, performs an operation for dynamically depicting interactions in a virtual world, comprising:
    accessing one or more content rules defining unacceptable content for a first user of the virtual world, wherein the one or more content rules specify at least one unacceptable content rating corresponding to unacceptable content for the first user of the virtual world, wherein the unacceptable content rating is selected from a plurality of predefined maturity ratings for the virtual world;
    analyzing, by operation of one or more computer processors, an activity profile for a second user in the virtual world to assign a maturity rating, selected from the plurality of predefined maturity ratings for the virtual world, to the second user, wherein the activity profile describes (i) how recently the second user visited a first location, and (ii) one or more actions taken by the second user at the first location;
    upon determining that the assigned maturity rating for the second user matches one of the at least one unacceptable content ratings defined for the first user, selectively blocking interactions between the first user and the second user in the virtual world; and
    upon determining that a third user is interacting with the second user within the virtual world:
      selectively limiting interactions between the first user and the third user in the virtual world; and
      controlling, for a virtual world client corresponding to the first user, a series of actions performed by an avatar corresponding to the third user according to a bot script, rather than based on inputs received from the third user, wherein the series of actions performed by the avatar corresponding to the third user are controlled based on the inputs received from the third user when viewed from a virtual world client of at least one other user of the virtual world.

12. The system of claim 11, wherein analyzing the activity profile comprises assigning a content rating to one or more activities in the activity profile.

13. The system of claim 11, the operation further comprising selectively displaying objects to the first user based at least in part on a comparison between the one or more content rules for the first user and the activity profile associated with the second user.

14. The system of claim 13, the operation further comprising selectively displaying objects to the second user based at least in part on a comparison between the one or more content rules for the first user and the activity profile associated with the second user.

15. The system of claim 14, the operation further comprising:
  upon detecting that the third user is interacting with the virtual world in a manner inconsistent with the one or more content rules for the first user, and associating a busy indicator with the third user.

16. The system of claim 11, the operation further comprising:
  analyzing additional activity history of the second user in the virtual world; and
  dynamically updating the activity profile for the second user, based on the analyzed additional activity history of the second user in the virtual world.

17. A computer program product for dynamically depicting interactions in a virtual world, comprising:
  a non-transitory computer-readable medium having computer readable program code embodied therewith, the computer readable program code comprising:

computer readable program code to access one or more content rules defining unacceptable content for a first user of the virtual world, wherein the one or more content rules specify at least one unacceptable content rating corresponding to unacceptable content for the first user of the virtual world, wherein the unacceptable content rating is selected from a plurality of predefined maturity ratings for the virtual world;

computer readable program code to analyze an activity profile for a second user in the virtual world to assign a maturity rating, selected from the plurality of predefined maturity ratings for the virtual world, to the second user, wherein the activity profile describes (i) how recently the second user visited a first location, and (ii) one or more actions taken by the second user at the first location;

computer readable program code to, upon determining that the assigned maturity rating for the second user matches one of the at least one unacceptable content ratings defined for the first user, selectively block interactions between the first user and the second user in the virtual world; and computer readable program code to, upon determining that a third user is interacting with the second user within the virtual world:

selectively limit interactions between the first user and the third user in the virtual world; and control, for a virtual world client corresponding to the first user, a series of actions performed by an avatar corresponding to the third user according to a bot script, rather than based on inputs received from the third user, wherein the series of actions performed by the avatar corresponding to the third user are controlled based on the inputs received from the third user when viewed from a virtual world client of at least one other user of the virtual world.

18. The method of claim 1, wherein the activity profile further describes (i) actions previously taken by the second user in the virtual world, (ii) activities taken part in by the second user and with one or more other users, distinct from the first user, in the virtual world, (iii) language previously used by the second user within the virtual world as part of one or more interactions with the one or more other users, (iv) users that the second user associates with in the virtual world and (v) a frequency at which the second user visits the first location.

* * * * *